United States Patent [19]

Gobrecht et al.

[11] Patent Number: 4,603,474

[45] Date of Patent: Aug. 5, 1986

[54] COLLECTOR FOR AN ELECTRIC MACHINE AND METHOD FOR ITS PRODUCTION

[75] Inventors: Jens Gobrecht, Gebenstorf; Claus Schüler, Widen, both of Switzerland

[73] Assignee: BBC Brown, Boveri & Company Limited, Baden, Switzerland

[21] Appl. No.: 611,514

[22] Filed: May 17, 1984

[30] Foreign Application Priority Data

Jun. 3, 1983 [CH] Switzerland ........................ 3071/83

[51] Int. Cl.[4] ..................... H01R 43/06; H01R 39/04; H02K 1/26

[52] U.S. Cl. ............................... 29/597; 29/DIG. 48; 228/122; 228/180.1; 228/188; 228/194; 228/903; 310/44; 310/45; 310/233

[58] Field of Search ......................... 29/597, DIG. 48; 228/121, 122, 124, 198, 263.12, 180 R, 188, 193, 194, 901, 903; 310/44, 45, 232, 233, 236, 237

[56] References Cited

U.S. PATENT DOCUMENTS 2,837,671 6/1958 Reardon et al. .................... 310/236
3,744,120 7/1973 Burgess et al. ...................... 228/198
3,766,634 10/1973 Babcock et al. .................... 228/188
3,777,367 12/1973 Kalagidis ............................. 29/597
3,911,553 10/1975 Burgess et al. ................. 228/903 X
4,035,908 7/1977 Ishi et al. ............................. 29/597
4,369,566 1/1983 Skrdlant et al. ....................... 29/597
4,505,418 3/1985 Neidig et al. .................. 228/198 X

FOREIGN PATENT DOCUMENTS 2510597 9/1975 Fed. Rep. of Germany ........ 29/597

*Primary Examiner*—Howard N. Goldberg
*Assistant Examiner*—R. S. Wallace
*Attorney, Agent, or Firm*—Oblon, Fisher, Spivak, McClelland & Maier

[57] ABSTRACT

A collector for electric machines, including a rotationally symmetrical sintered ceramic body and a plurality of radially disposed metallic segments which are separated from each other by one interspace each and which are bonded to the ceramic body via a eutectic intermediate layer. The segments are bonded to the ceramic body in accordance with the eutectic method by being surface-oxidized on their inside narrow side and radially pressed against the ceramic body with the totality being brought to the melting temperature corresponding to the metal/metal-oxide eutectic and subsequently being cooled down again. A preferred embodiment includes: copper segments on an $Al_2O_3$ ceramic body.

9 Claims, 6 Drawing Figures

COLLECTOR FOR AN ELECTRIC MACHINE AND METHOD FOR ITS PRODUCTION

BACKGROUND OF THE INVENTION

1. Field of the Invention

This invention relates to a collector for an electric machine, and to a method for its production.

2. Description of the Prior Art

Collectors for electric machines consist of radially disposed centrosymmetrically aligned metallic segments (copper bars) which form a cylindrical rotational body and which are insulated from each other and held together by rings. In the case of the so-called V-ring collector, the segments have a dovetailed construction and are held togethr, with interposition of mica insulation, by V-rings which exert an axial pressure. In contrast, the segments of the shrink-ring collector are held together by shrink rings which exert radial forces on the whole stack of segments. In all cases, the latter must be insulated overall against adjacent metal parts. For this purpose, mica and mica products are predominantly used.

In operation, collectors are subjected to very high mechanical and thermal stresses. For this reason, they are in most cases designed as so-called arch-bound collectors. This means that neighboring segments must not be forced apart even at the higher peripheral speeds (over speed) but must still rest against each other under mutual tangential pressure. The calculation and design of these conventional collectors, therefore, requires great care and experience. Their production and their whole technology (heat treatment, seasoning) represents virtually a craftman's art on which very high demands are made. This is associated with the fact that the mica insulation has a tendency to instability. The mica products have no tensile strength whatever perpendicularly to the plane of their layers and only a negligibly low shear strength parallel to this plane. For this reason, they may be subjected only to pressure loads perpendicularly to the plane of their layers. The individual mica flakes have a tendency to become displaced with respect to each othe which can be caused by non-uniform heating (start-up from standstill in the case of traction motors) or mechanical overloading. This can cause individual segments to be irreversibly displaced and lead to operational disturbances.

The preceding clearly shows that the conventional collector is a quite complicated structure which tends to have mechanical instabilities and geometric changes and the whole production technology of which is time-consuming and expensive and is associated with much mechanical skill. The need exists, therefore, to simplify the design and to shorten the production method.

From the art of metal coating, applied primarily in electronics during the production of printed circuits, the direct bonding of metals to ceramic materials in accordance with the so-called eutectic method is known. In this method, a bonding mechanism which is active in the sub-microscopic atomic region is utilized by generating a metal/metal-oxide eutectic, the melting point of which is only just below that of the pure metal. This bonding mechanism, which acts directly and without additional intermediate layers at the metal/ceramic interfaces permits firmly adhesive bonding between the two unequal components (see, for example, J. F. Burgess and C.A. Neugebauer, "The Direct Bonding of Metals to Ceramics by the Gas-Metal Eutectic Method", J. Electrochem. Soc., May 1975, Vol. 122, No. 5; J. F. Burgess, C. A. Neugebauer, G. Flanagan, R. E. Moore, "The Direct Bonding of Metals to Ceramics and Applications in Electronics", General Electric Report No. 75CRD105, May 1975; U.S. Pat. No. 3,766,634; U.S. Pat. No. 3,911,553).

SUMMARY OF THE INVENTION

Accordingly, one object of the invention is to provide a novel collector for an electric machine which in its totality behaves as much as possible as a monolithic body, contains no insulating intermediate layers whatever which tend to be subject to mechanical instabilities and the construction of which is as simple as possible. The corresponding production method should be reproducible with simple means and should not make any high demands an mechanical skill.

This objective is achieved by novel collector for an electric machine including a rotationally symmetrical central sintered ceramic body and radially positioned metallic segments disposed on a jacket surface of the sintered ceramic body, wherein the metallic segments are separated from each other by one interspace each and bonded to the sintered ceramic bonding by means of a eutectic intermediate layer.

Further according to the invention there is provided a novel method for producing a collector for an electric machine, wherein initially a rotationally symmetrical ceramic body is sintered and a plurality of metallic segments are surface-oxidized on their inside narrow sides and are disposed around a jacket surface of the ceramic body. The method includes exerting a radially acting press-on pressure and heating the totally in a furnace to the temperature required for generating a metal/metal-oxide eutectic such that the ceramic and metal parts are eutectically bonded, followed by a step of cooling down to room temperature.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
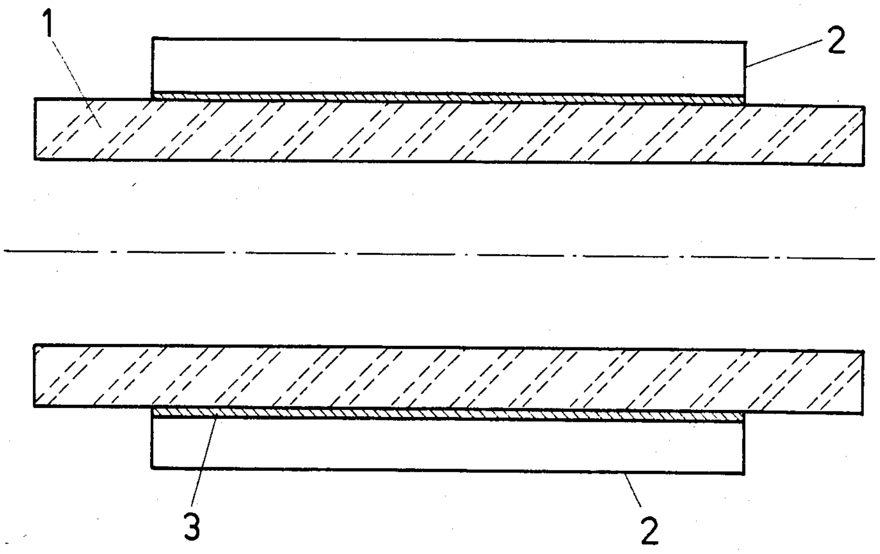
FIG. 1 is a longitudinal sectional view through a collector having a smooth ceramic body.

Referring now to the drawings, wherein like reference numerals designate identical or corresponding parts throughout the several views, FIG. 1 is a longitudinal cross-sectional view through a collector having a smooth ceramic body. Numeral 1 designates a rotationally symmetrical sintered ceramic body ($Al_2O_3$) having a smooth cylindrical jacket surface. Numeral 2 designates a metallic segment (copper bar) having a rectangular cross-section and a level inner boundary area. The connection between ceramic body 1 and metallic segment 2 is ensured by a eutectic intermediate layer 3 ($Cu/Cu_2O$ eutectic). The inner boundary area of the ceramic body 1 can have different shapes and can also deviate from the cylindrical shape. In particular, shoulders, recesses and so forth can be provided for constructional reasons of attachment to the shaft of the machine.

Figure 2:
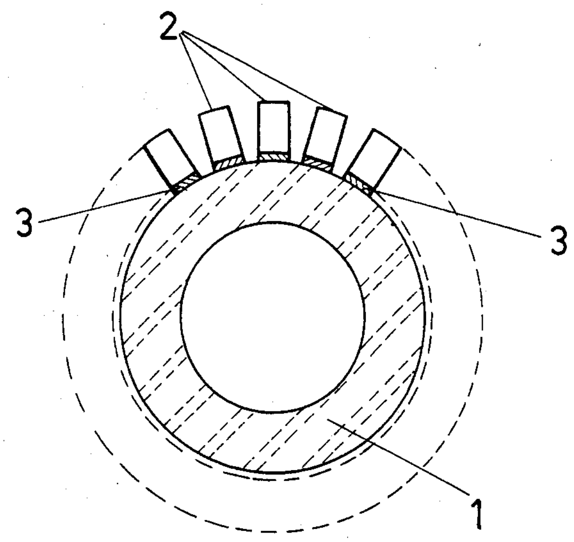
FIG. 2 is a cross-sectional review through a collector having a smooth ceramic body.

FIG. 2 is a cross-sectional view through the collector of FIG. 1 wherein the thickness of the eutectic intermediate layer 3 has been drawn to be greatly exaggerated in order to emphasize its significance. In reality, this thickness is on the order of approximately 5 to 50 $\mu$m.

Figure 3:
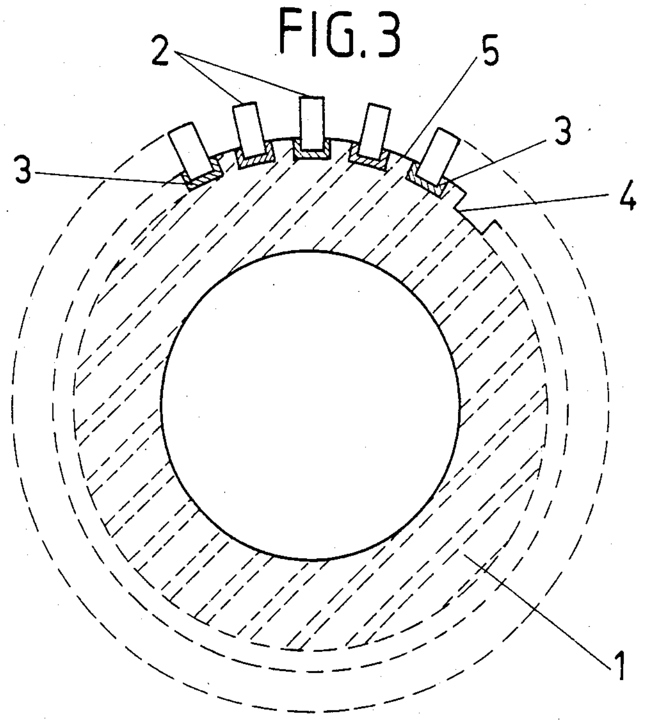
FIG. 3 is a cross-sectional view through a collector having a ceramic body which has been subject to wear.

FIG. 3 represents a collector with a used ceramic body in cross-section. Numeral 4 designates a slot in the ceramic body 1 which proceeds parallel to the axis of the latter and numeral 5 designates the corresponding land. The segments 2 are inserted into the slots 5 virtually without play. The remaining reference designations correspond to those of FIG. 2.

Figure 4:
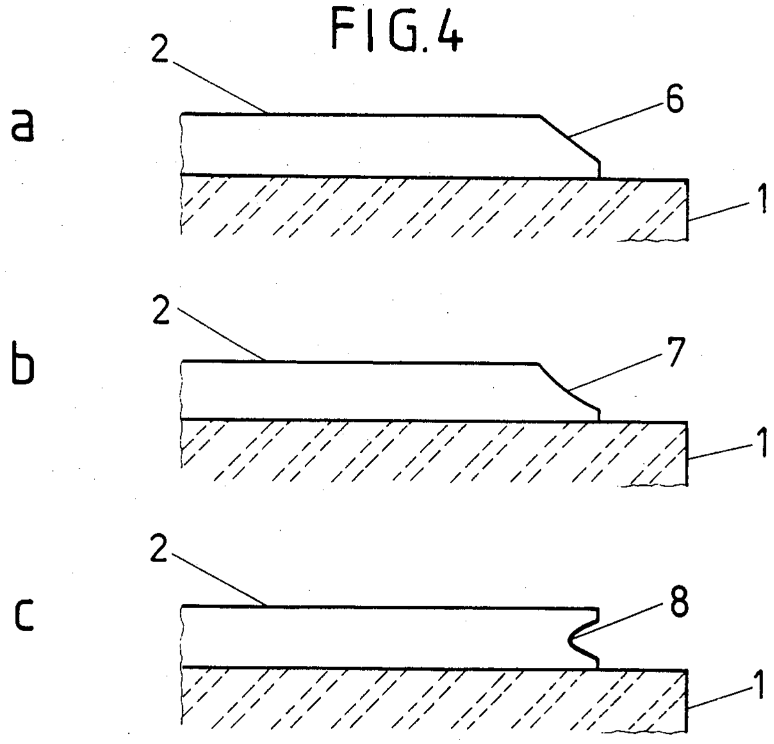
FIGS. 4*b* and 4*c* are top views of different shapes of segments.

FIG. 4 shows the top views of various shapes of the segments. In each case, the front parts of the segment 2 have a radial height which decreases towards the end. In FIG. 4*a*, the front part of the segment 2 has a tapered surface 6. In FIG. 4*b*, the segment 2 has a filleted end, and in FIG. 4*c*, in the last case, the end of the segment 2 is provided with a stress-relieving notch 8.

PRACTICAL EXAMPLE I

See FIGS. 1 and 2.

A dense ceramic body 1 was produced by sintering from commercially pure aluminum oxide. The ceramic body 1 was rotationally symmetrical and, in general, had an approximately hollow cylindrical shape with the following dimensions and characteristics:

Outside diameter: 56 mm
Inside diameter: 47 mm
Radial wall thickness: 4.5 mm
Axial Length: 95 mm
Purity: 99.8% $Al_2O_3$
Density: 3.86 kg/dm$^3$
Tensile strength: 200 Mpa
Bending strength: 400 Mpa The ceramic body 1 was initially subjected to the following preliminary treatment:

Degreasing: FREON 22, ultrasonics, 10 minutes.

Removal of organic residues: $H_2SO_4$ concentration, 150° C., 20 minutes.

Removal of metallic residues: Aqua regia, 20° C., 20 minutes.

Distilled water, ultrasonics twice, 10 minutes.

Drying: Heating to 1,000° C. over two hours in the oven in air, holding for 20 minutes, cooling down to room temperature, 4 hours.

For the production of the segments 2, the original material was a solid plate of electrolytic copper of 176×75×5 mm. On one side, parallel slots with a width of 0.6 mm, a depth of 3.5 mm and a center-to-center distance of 4.75 mm were milled into the copper plate Following this, the milled copper plate was annealed in a protective atmosphere (90% Ar/10% $H_2$) for 20 minutes at a temperature of 800° C. for stress-relieving and softening the material. The cooled copper plate was coated on its level, unmilled side with a resist and immersed for the purpose of surface-oxidation for 20 minutes in a chemical bath having the following composition:

5 gr—$KMnO_4$
20 gr—$CuSO_4$
1,000 ml—$H_2O$ dist.

Substantially, the copper plate was rinsed in distilled water for 2×10 minutes and the resist on the outside was removed. The copper plate, slotted side pointing inwards, was now bent around the ceramic body 1 so that a complete hollow-cylindrical body with an outside diameter of 66 mm was formed. In this position, the bent copper body was radially pressed and held tight against the ceramic body 1 under application of a tensile stress by winding molybdenum wire with a thickness of 0.2 mm around the copper body.

In a deviation from this method, the copper body is pressed against the ceramic body 1 by a holding device, consisting of a super alloy of nickel (for example IN100), interposing a thin molybdenum plate (with a thickness of approximately 0.05 mm) in order to prevent undesirable metallurgical bonding between the workpiece and the tool.

The whole was now slowly pushed into a tube furnace so that the workpiece reached a temperature of 1,072° C. (±2° C. tolerance) in the course of 30 minutes. As a result, a eutectic intermediate layer 3 ($Cu/Cu_2O$ eutectic) formed at the previously oxidized interfaces between the copper body and the ceramic body 1 which layer has a melting point of 1,065° C. In comparison, the pure copper has a melting point of 1,083° C. The liquid eutectic phase forming wetted both the ceramic body 1 and the copper body to an excellent degree, entering the pores of the former. Workpiece and clamping device were left at the 1,072° C. temperature for 25 minutes and were then cooled down to room temperature in the course of another 30 minutes. During this time, the previous liquid phase solidified and formed a firm bound (intermediate layer 3) between the copper body and the ceramic body 1. The total heat treatment of the eutectic bonding process was carried out under a protective atmosphere (highly pure nitrogen with less than 5 ppm $H_2O$ and $O_2$).

After cooling, the workpiece was removed from the holder and the hollow-cylindrical copper body was desurfaced to an outside diameter bf 63 mm until breakthrough of the slots. The exposed segments 2 which were produced by this step of the method have now no further link between each other.

PRACTICAL EXAMPLE II

See FIG. 3.

From aluminum oxide, a ceramic body 1 provided at its external periphery with slots 4 and lands 5 was produced by means of extrusion and sintering. Its characteristics corresponded to those of Example I. The dimensions were:

Outside diameter: 103 mm
Inside diameter: 75 mm
Tangential slot width: 4.2 mm
Radial slot depth: 1.0 mm
Tangential land width: 1.2 mm
Axial length: 140 mm
Number of slots: 60

The ceramic body 1 was pretreated according to Example I.

The segments 2 of electrolytic copper had a rectangular cross-section and had the following dimensions:

Tangential width: 4.2 mm
Radial height: 6 mm
Axial length: 105 mm

The segments 2 were surface-oxidized in a chemical bath as specified in Example I. Following that, they were pressed, by means of a high-temperature resistant clamping device radially into the slots 4 of the ceramic body and held tight. Heat treatment for the purpose of producing the eutectic intermediate layer 3 was carried out exacty in accordance with the Example I. The eutectic intermediate layer 3 forming during this process flowed in a U-shape around the segments 2 and after solidification bonded them to the ceramic body 1 on all sides along the total slot 4. This method is used especially for producing collectors of larger dimensions.

The invention is not restricted to the practical examples provided. In the case of the $Cu/Cu_2O$ eutectic, the temperature for heating the workpiece sections to be bonded may be 1,075±7° C. The ends of the segments 2 are constructed with decreasing radial height in order to remove internal stresses and to prevent stress peaks at the points of discontinuity. For this purpose, the tapered (6) or filleted (7) ends of the segments 2 and the stress-relieving notch 8 shown in FIG. 4*a* to *c* are used. The ceramic body 1 can consist of zirconium oxide or of aluminum oxide doped with zirconium oxide. The segments 2 can also consist of a material which is different from copper or from a copper alloy and only be copper-plated on the surface to be bonded to the ceramic body 1. Eutectics which are different from $Cu/Cu_2O$ can also be used for bonding.

The advantages of the new collector can be summarized as follows:

- simplification of production and shortening of the production time, especially elimination of "seasoning" (heat treatment).
- lower demands on mechanical skill in production.
- simple, monolithic construction of the collector.
- elimination of constructional elements tending to short-circuits, and short-circuits to frame.
- high thermal overload capacity, high resistance to cycling temperature stress of individual segments without the risk of irreversible displacements.
- simplification and facilitation of maintenance and repair work in operation.
- elimination of the time-consuming, periodic milling out of the interspaces (slots), filled with mica products, between the segments in operation.

In general, at least the surfaces to be bonded to the ceramic body (1) of the segments (2) must be oxidized before the eutectic bonding. However, naturally all surfaces can also be subjected to this step of the method which represents a simplification in certain cases.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A collector for an electric machine, comprising:
   a rotationally symmetrical central sintered ceramic body having a jacket surface; and
   radially positioned surface-oxidized metallic segments disposed on said jacket surface, said segments separated from each other by an interspace and bonded to said jacket surface by means of a eutectic intermediate layer.

2. A collector as claimed in claim 1, wherein said ceramic body comprises a material selected from the group consisting of densely sintered aluminum oxide, aluminum oxide doped with zirconium oxide, and zirconium oxide, the metallic segments comprise a material selected from the group consisting of copper and a copper alloy, and the intermediate layer consists of the copper/copper-oxide eutectic.

3. A collector as claimed in claim 1, wherein the ceramic body has a smooth cylindrical jacket surface and the segments have inside tangential planar boundary surfaces adjacent said smooth cylindrical jacket surface.

4. A collector as claimed in claim 1, wherein the ceramic body has outer boundary surface including slots and lands.

5. A collector as claimed in claim 1, wherein the metallic segments have faces defining a radial height which decreases towards an end.

6. A collector as claimed in claim 1, wherein the metallic segments have faces including stress-relieving notches.

7. A method for producing a collector for an electric machine, comprising:
   initially sintering a rotationally symmetrical ceramic body having a jacket surface;
   surface-oxidizing a plurality of metallic segments;
   disposing the surface-oxidized segments around the jacket surface of the ceramic body;
   exerting a radially acting press-on pressure on the ceramic body and the segments;
   heating the ceramic body and the segments with pressure exerted thereon in a furnance to a temperature required for generating a metal/metal-oxide eutectic such that said ceramic body is eutectically bonded to said metal segments; and
   cooling down to room temperature the bonded ceramic body and metallic segments.

8. A method as claimed in claim 7, wherein a ceramic body of aluminum oxide is densely sintered and bonded to segments of copper to produce a eutectic intermediate layer by bringing said ceramic body and said copper segments to a temperature of 1,072±7° C. and subsequently cooling said aluminum oxide ceramic body and said copper segments down to room temperature.

9. A method as claimed in claim 7, comprising:
   providing a copper plate having on one side thereof parallel rectangular longitudinal slots of a predetermined width corresponding to a tangential distance between the segments;
   bending said plate around the ceramic body such that the longitudinal slots lie on the inside and parallel to the longitudinal axis of the ceramic body, the outside forming a smooth cylindrical body;
   clamping said body with said plate in a device exerting radial compressive forces;
   heating said clamped body and plate to the eutectic temperature;
   cooling down said heated clamped body and plate again to room temperature; and
   desurfacing the outside cylindrical copper jacket down to where the longitudinal slots break through.

* * * * *